United States Patent [19]

Mirring

[11] 4,222,620
[45] Sep. 16, 1980

[54] CAGE FOR A ROLLING BEARING MADE OF SYNTHETIC MATERIAL

[75] Inventor: Knut Mirring, Gochsheim, Fed. Rep. of Germany

[73] Assignee: SKF Industries, Inc., King of Prussia, Pa.

[21] Appl. No.: 7,784

[22] Filed: Jan. 30, 1979

Related U.S. Application Data

[63] Continuation of Ser. No. 801,298, May 27, 1977, abandoned.

[30] Foreign Application Priority Data

Aug. 18, 1976 [DE] Fed. Rep. of Germany ... 7625839[U]

[51] Int. Cl.$^3$ ........................ F16C 19/20; F16C 33/46
[52] U.S. Cl. ................................................. 308/217
[58] Field of Search ............... 308/217, 218, 201, 213, 308/235; 29/148.4 C

[56] References Cited

U.S. PATENT DOCUMENTS

| | | | |
|---|---|---|---|
| 1,765,648 | 6/1930 | Bott | 308/217 |
| 3,495,889 | 2/1970 | Nisbet | 308/213 |
| 3,647,273 | 3/1972 | Pfaffenberger | 308/217 |
| 3,881,790 | 5/1975 | Ryanen | 308/217 |

FOREIGN PATENT DOCUMENTS

| | | | |
|---|---|---|---|
| 993520 | 11/1951 | France | 308/201 |
| 1390496 | 4/1975 | United Kingdom | 308/217 |

Primary Examiner—Frederick R. Schmidt
Attorney, Agent, or Firm—Eugene E. Renz, Jr.

[57] ABSTRACT

A one-piece cage for a rolling bearing assembly made of an elastically deformable, synthetic material. The cage comprises a pair of spaced annular members of a predetermined uniform radial height, a plurality of axially extending webs between the annular members and of a maximum radial dimension only slightly greater than the radial height of the annular members. The webs are circumferentially spaced to define a plurality of pockets for rolling elements and have arcuate confronting faces conforming generally to the contour of the rolling elements. Each web has inner and outer projections adjacent inner and outer end portions which are spaced apart a distance less than the diameter of the rolling elements to retain the rolling elements in the pockets and provide a certain amount of flexibility to permit assembly of the rolling elements in the pockets from either radial direction. By the particular configuration of the webs and the annular members, the rollers are encapsulated about substantially their entire periphery to provide for good guidance characteristics and to this end the pitch circle of the rolling elements lies in a circular plane disposed approximately midway of the radial height of the annular members. By this construction only a small portion of the rolling elements projects radially beyond the inner and outer circumferential edges of the annular members.

2 Claims, 3 Drawing Figures

U.S. Patent  Sep. 16, 1980  4,222,620
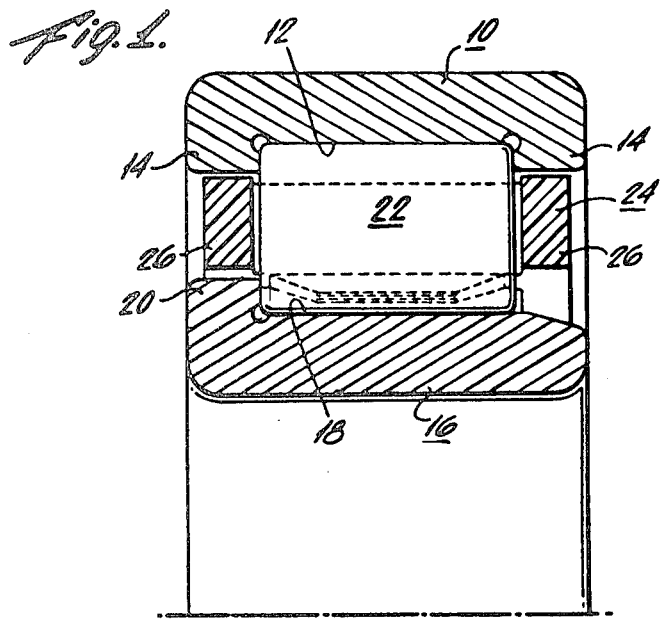
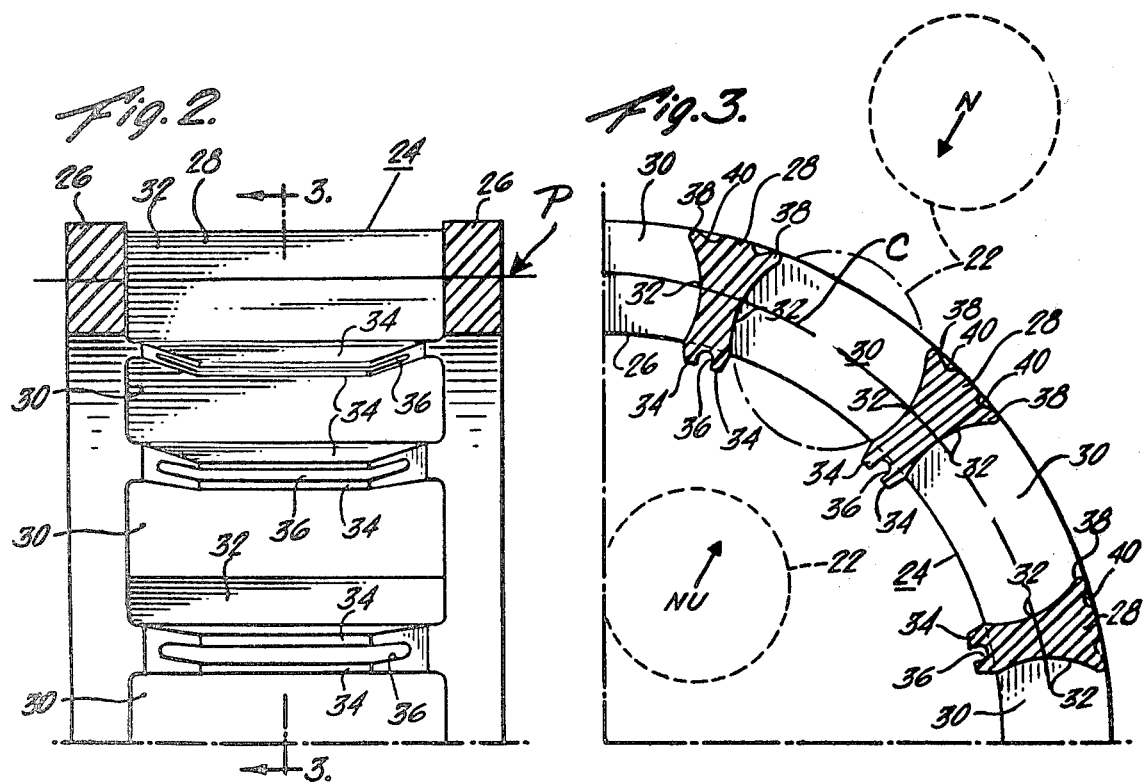

CAGE FOR A ROLLING BEARING MADE OF SYNTHETIC MATERIAL

This is a continuation of my prior application Ser. No. 801,298 filed May 27, 1977 now abandoned for *A CAGE FOR A ROLLING BEARING MADE OF A SYNTHETIC MATERIAL.*

BACKGROUND OF THE INVENTION

The present invention relates to a one piece cage for rolling bearings made of a synthetic material having a predetermined configuration providing greater encapsulation of the rollers which results in less "roller sag." The cage is also characterized by novel features of construction and arrangement to minimize the amount of cage flexing and therefore provide maximum roller support and optimum running accuracy.

Cages of this type having radially outwardly extending projections are known in the prior art. Thus this type of cage permits insertion of the rollers into the pockets of the cage from a direction radially outwardly of the cage. Accordingly the cage is limited in its application for bearings wherein the inner ring is provided with rims on at least one or both sides of the inner raceway and the outer ring is rimless. The cage is not suitable for a rimmed outer ring. There are also cages having projections which extend radially inwardly into the cage bore. This cage of course is not suitable for bearings with rims on the inner ring on either side of the raceway.

There are also prior cages made of metal comprising annular members and intermediate webs defining pockets for the rollers. In these cages the webs are spaced apart to permit free insertion of the rollers from a radial direction and then are peened over to form projections thereby fixing the rollers in the pocket. These subsequent peening operations, of course, increase the cost of the cage and the overall assembly.

Other prior art patents which show cages bearing a superficial resemblance to the cage of the present invention but which do not have the structural features and details of the present invention and therefore the functional advantages are as follows: Ryanen U.S. Pat. No. 3,881,790, the annular members are not of a uniform height for their circumference and comprise a series of sections alternatingly offset radially. In order for the cage to be balanced, this construction does not provide the flexibility in terms of the number of pockets and is limited to an even number of pockets. Furthermore, since the annular members or side rings are not continuous over the radial extension of the cage webs, the rollers are not encapsulated to the extent that they are in applicant's cage. Furthermore, as seen in FIG. 4, the relief cut 10 extends inwardly beyond the inner edge of the annular members so that there is more of a tendency for this cage to flex. In summary, with the non-symmetrical design in Ryanen there is a greater possibility of cage flexing and therefore does not provide the same roller support and running accuracy as applicant's cage.

The Pfaffenberger U.S. Pat. No. 3,647,273 shows a cage made of two side rings and a number of separately manufactured webs which are connected to the side rings by swaging over the ends of the webs. This cage does not include flexible projections on the inner and outer edges of the webs. This cage is obviously much more complicated and expensive to manufacture than applicant's cage and does not allow for the assembly flexibility of applicant's cage noted above.

Nisbet U.S. Pat. No. 3,495,889 is also a plural-piece cage requiring the parts to be assembled in a very precise manner or otherwise the running performance of the cage is adversely affected. Furthermore due to the fact that only one part of the cage has deformable projections, the rollers can be snapped in only from one side. The annular members and webs are clearly different from the applicant's symmetrical design providing good encapsulation of the rollers. In a symmetrical arrangement, any number of roller pockets may be provided and the rollers are guided equally and uniformly on both sides of the cage. Applicant's cage, therefore, allows for the maximum number of and size of rollers and therefore the bearing capacity is optimized.

In Bott U.S. Pat. No. 1,765,648, the relief cuts in the cage are extremely deep and extend close to the pitch line of the rolling elements. This construction as noted above results in cage flexing which adversely affects roller support and running accuracy.

The British Pat. No. 1,390,496 and French Pat. No. 993,520 show essentially similar type cages wherein the flexible portions of the webs extend substantially beyond the outer edges of the side pieces. In this construction the rollers are only insertable from outside the cage. Furthermore the flexible portions are unsupported by the side rings. Therefore, cage flexing is inherent which provides inadequate roller support and running accuracy.

SUMMARY OF THE INVENTION

The present invention provides a solution to the problem of high cost and limited utilization of cages by providing a universally utilizable cage, i.e. one suitable for bearings with rimmed inner or outer rings thereby on the one hand decreasing the cage variables and on the other hand simplifying the number of types of cages that have to be stocked to accommodate various type bearings. The cage is preferably made of a synthetic, elastically deformable material such as a moldable plastic and therefore is capable of being produced to finished dimension in essentially one operation with no subsequent machining, peening, or processing as is the case with the prior cage types discussed above.

In accordance with another feature of the cage of the present invention, the annular members are continuous and of substantially uniform radial height so that the pockets are not limited to odd or even numbers and therefore the cage can accommodate the maximum number and optimum size rollers to achieve maximum capacity. Further, the specific construction of the annular members and webs is also such to provide a greater encapsulation of the rollers which results in less roller sag. Thus the pitch circle of the set of rollers lies in a circular plane approximately midway between the annular members and the webs are contoured to facilitate this positioning of the rollers in relation to the annular members. Moreover the radial height of the annular members is only slightly less than the diameter of the rollers and the projections to one side of the web which retain the rollers in place only extend slightly beyond the circumferential inner and outer edges of the annular members. This construction minimizes the amount of cage flexing and therefore provides maximum roller support and optimum running accuracy. In the specific embodiment illustrated, the top edge of the cross pieces or webs is coincident with the outer circumferential edge of the annular members except for the relatively shallow indentation defining flexible webs to permit insertion of the rollers from radially outwardly of the cage. The webs have a small radial projection beyond the inner edge of the annular members with a shallow groove which extends to a point slightly below the inner edge of the annular members.

Thus an object of the present invention is to provide a cage which is stronger and by reason of the molding process can be shaped so that more of the web surfaces surround the rollers in the cage pockets and one which has less of a tendency to sag which is advantageous when the outer ring and the set of rollers are assembled as a unit and then pushed onto the inner ring or when the inner ring and rollers are assembled as a unit and then pushed into the outer ring.

A further object of the cage of the present invention is that it is possible to assemble the rollers from radially outside as well as from radially inside the cage. This of course means that the same cage may be utilized either for bearings with rims on the inner ring or for bearing rings having rims on the outer ring. As noted above, the projections are formed during the molding process so that any after processing is avoided.

Another object of the present invention is to provide a cage having greater stability.

BRIEF DESCRIPTION OF THE DRAWINGS

These and other objects of the present invention and the various features and details of the construction thereof are hereinafter more fully set forth with reference to the accompanying drawing, wherein:

FIG. 1 is a transverse cross sectional view through a roller bearing with a cage constructed in accordance with the present invention;

FIG. 2 is a sectional view through the cage; and

FIG. 3 is a section taken on lines 3—3 of FIG. 2.

DETAILED DESCRIPTION OF THE PREFERRED EMBODIMENT

Referring now to the drawing, and particularly to FIG. 1 thereof, there is illustrated a typical roller bearing comprising an outer ring 10 having a raceway 12 and circumferentially extending, radially inwardly directed rims 14, 14 at opposite axial ends of the raceway, an inner ring 16 having a raceway 18 and one circumferentially extending, radially outwardly projecting rim 20 at one axial end. The raceways are spaced apart to define an annular space for a set of rollers 22. The rollers are maintained in predetermined circumferentially spaced relation in the annular space by means of a cage 24.

The cage 24, which is preferably made of a moldable, deformable material such as plastic, has a pair of annular members or side rings 26 connected by a plurality of axially extending webs 28 which are circumferentially spaced to define roller pockets 30. As illustrated the confronting side faces 32 of the webs are arcuate and disposed on the circumference of a circle closely conforming to the cross section of the rollers. Each web 28 has inwardly directed flexible rib-like projections 34 extending radially beyond the side rings and as illustrated in the drawings separated by a groove 36. The outer portion of each web is also formed with lip-like projections 38 cut back as at 40 so that the lips are generally flexible. Because of the flexibility of the projections the rollers may be inserted into the pockets either from the outside or the inside as illustrated in the drawings. In this fashion the cage is suitable for a bearing having a rimmed outer ring, commonly referred to as an NU type bearing or one with a rimmed inner ring commonly referred to in the industry as an N bearing.

Another important feature of the present invention is the specific configuration and construction of the annular members and webs which provides substantial encapsulation of the rollers resulting in less roller sag and also minimizes the amount of cage flexing and therefore provides maximum roller support and optimum running accuracy. This is provided in the cage of the present invention by annular members of substantially uniform radial height for the entire circumferential extent thereof and the cross pieces or webs which in the present instance have their upper edges coincident with the outer circumferential edge of the annular members and only project slightly beyond the inner peripheral or circumferential edge of the annular members in the manner best illustrated in FIG. 3. Further, the pitch circle C of the rolling elements lies in a circular plane passing through approximately the mid point P of the annular members and also the central height of the webs 32.

The cage is preferably made of a moldable plastic material so that the side rings webs and the projections may be formed integrally in one operation thereby reducing the number of forming operations and greatly reducing the cost of making the assembly.

What is claimed is:

1. A one-piece cage for a rolling bearing assembly made of an elastically deformable synthetic material comprising a pair of spaced annular members of a predetermined uniform radial height having an inner peripheral edge, a plurality of axially extending webs between said annular members and being of a maximum radial dimension only slightly greater than the radial height of said annular members, said webs being circumferentially spaced to define a plurality of pockets for rolling elements, the webs having arcuate confronting faces conforming generally to the contour of the rolling elements, each web having inner and outer projections adjacent inner and outer end portions thereof spaced apart a distance less than the diameter of the rolling elements to retain the rolling elements in the pockets and being flexible to permit assembly of the rolling elements in the pockets from either radial direction, the side edges of the inner projection of each web tapering inwardly, the pitch circle of the rolling elements lying in a circular plane disposed approximately midway of the radial height of said annular members whereby only a small portion of the rolling elements project radially beyond the inner and outer circumferential edges of said annular members each of said webs including a shallow groove in the outer end portion adjacent and inboard of said outer projections and a shallow axial recess in the inner projection of each web generally parallel to the inner projection which extends slightly beyond the inner peripheral edge of said annular members, the unrelieved portion of each web between said grooves and recess comprising substantially the entire radial height of said web for the major portion of its contact with the rolling elements on either side of the pitch circle, said cage being symmetrical relative to a plane transverse to the axis of the cage passing midway of said webs.

2. A cage as claimed in claim 1 wherein the projections at least at one end of said webs extend radially beyond said annular members.

* * * * *